Figure 1:
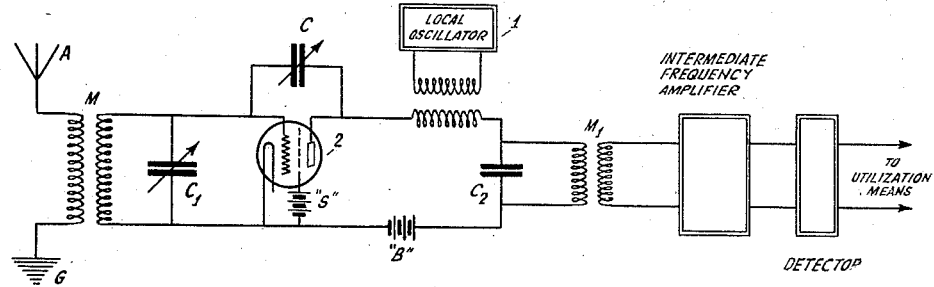

June 17, 1930.    W. VAN B. ROBERTS    1,764,751
SUPERHETERODYNE RECEIVER
Filed March 29, 1929

Inventor
WALTER VAN B. ROBERTS
By his Attorney

Patented June 17, 1930

1,764,751

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

SUPERHETERODYNE RECEIVER

Application filed March 29, 1929. Serial No. 350,947.

The present invention relates to heterodyne receivers, and, more particularly, to a superheterodyne receiving circuit wherein signals are received only at one of the two possible oscillation frequencies employed to produce beat notes.

It is often desirable, in heterodyne receiving circuits, especially in the case of a superheterodyne receiver, to limit the heterodyning oscillations to one of the two possible frequencies which it is found necessary to employ in conjunction with a predetermined signal frequency, to secure a particular beat, difference of intermediate frequency. It is to be appreciated that the need for devising a system for accomplishing such a limitation, is pressing because of the fact that in normal operation of a local oscillator more than one possible heterodyning frequency is secured. The disadvantage in permitting the existence of two possible heterodyning frequencies resides in the fact that the same station may be received on two points of the dial, thus confusing the operator.

Accordingly, it is one of the main objects of my present invention to provide a method of, and novel means for, balancing the effects of heterodyne voltages on grid and plate of a frequency changer, for one of the possible heterodyne frequencies, while they are not in balance for the alternative heterodyne frequency.

Another important object of the invention is to provide a superheterodyne receiver so arranged that only one of the two possible heterodyne frequencies that might yield the required beat note, is permitted to produce an effect in the circuit, the arrangement including a frequency changer, having a tunable grid circuit, a local oscillator capable of producing the said two possible heterodyning frequencies, in such relationship that when the grid circuit is tuned to the desired signal frequency, the impedance between the grid and filament, at the lower possible heterodyne frequency, is an inductive reactance, whereby the effectiveness of the lower heterodyning frequency in the production of beats is substantially eliminated, and only the higher possible heterodyne frequency permitted to be active.

The novel features which I believe to be characteristic of my invention are set forth in particularity in the appended claims, the invention itself, however, as to both its organization and method of operation will best be understood by reference to the following description taken in connection with the drawing in which I have indicated diagrammatically two circuit organizations whereby my invention may be carried into effect.

Figure 2:
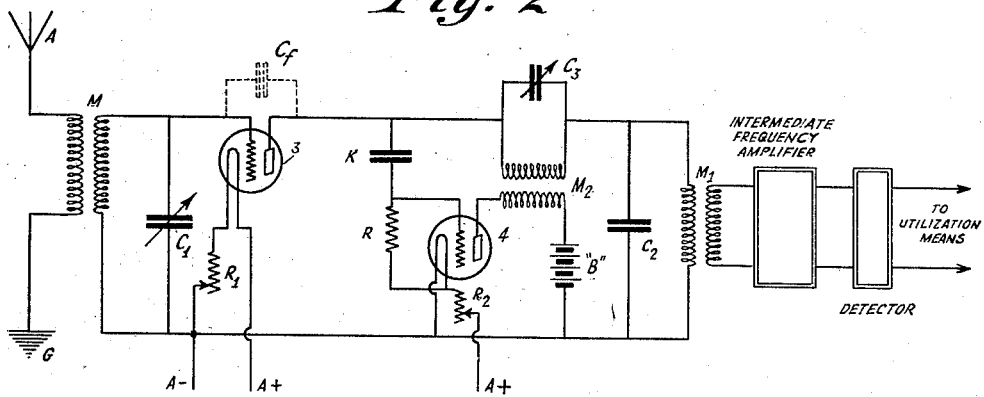

In the drawing,

Figure 1 shows diagrammatically a heterodyne circuit embodying one form of my invention, Figure 2 is a diagrammatic circuit embodying a modified form of the invention.

Referring now to Figure 1, it will be observed that a local oscillator 1 is shown coupled to the plate circuit of a frequency changer 2, which frequency changer is an electronic discharge tube of the well known screen-grid type. A variable capacity C is connected between the grid and plate of the tube 2, it being observed that the screen element of the tube is properly biased by a battery "S", in the well known and conventional manner. The input circuit of the frequency changer 2 is tuned by a variable capacity $C_1$, the tuned circuit being coupled, as shown at M to a grounded antenna circuit A, G.

The plate of the tube 2 is energized by a source "B", the output circuit of the tube 2 being coupled to an intermediate frequency amplifier by a coupling $M_1$. A capacity $C_2$ is shunted across the primary coil of the coupling $M_1$ to by-pass the radio frequency currents of the incoming signal. The output from the amplifier is detected and employed in any type of utilization means, such as phones or a loud speaker, in the well known manner.

The operation of the circuit is best explained by considering the circuit from the view-point of the variable capacity C. When C equals zero, the heterodyne voltage from the oscillator 1 is impressed on the plate circuit of the frequency changer tube 2, and it is obvious that either of two possible heterodyne frequencies will give the desired difference or intermediate frequency beat note. Assuming, that signal energy of a frequency equal to 500 kilocycles is being received, and that the desired intermediate frequency is 100 kilocycles, it is obvious that the local oscillator could generate oscillations of two frequencies (400 and 600 kilocycles) which would combine with the signal frequency to produce a beat note of 100 kilocycles. Now with the improvements and adjustments made in my disclosed circuit, it is possible to completely balance out the effectiveness of the lower possible oscillating frequency viz; 400 kilocycles, and only retain the heterodyning effect of 600 kilocycle oscillations.

For, it will be observed that if capacity C is increased, a point will be reached where the lower possible heterodyne frequency (400 kilocycles in the example given) impresses a voltage on the plate, and also a reversed voltage on the grid of tube 2. This phenomenon may be ascribed to the fact that when the grid circuit is tuned to the signal frequency, the impedance between grid and filament at the lower heterodyne frequency, is an effective inductive reactance. It follows, therefore, that the current flowing from plate to filament, through the capacity C (which current is 90 degrees ahead in phase of the locally impressed heterodyne voltage) produces a drop across the input circuit 180 degrees ahead of the lower frequency local oscillation voltage.

The capacity C is adjusted for such a value that, not only is the grid potential due to the local oscillation opposite in phase to the plate potential due to the same oscillations, but is of such magnitude that the two potentials on the plate and grid due to the lower local oscillation neutralize each other's effectiveness in producing beats.

When the local oscillator 1 is adjusted to the higher of the two possible local frequencies (600 kilocycles in the example given) the grid circuit presents capacitive reactance to the local oscillations, and the grid potential, engendered by these local oscillations, assists the plate potential in producing the desired beats. Preferably, the variable capacity C is uni-controlled with the variable capacity $C_1$, that is to say with the signal circuit tuning, inasmuch as there is a definite optimum value of the capacity C for each adjustment of the tunable input circuit of the frequency changer 2.

It will also be apparent to those skilled in the art that with slight changes in the disclosed circuit, the higher of the two possible heterodyning frequencies may be suppressed, and the lower one utilized. By replacing the variable capacity C with a variable inductance the converse of the heretofore described action would be secured, it being understood that the basic operation of the circuit would be analogous. It is also to be understood that I am not limited to the use of a frequency changer of the screen-grid type of tube, inasmuch as I have found that satisfactory results are obtained in practice with a fixed value of C. For example, this fixed capacity may be the grid-plate capacity of an ordinary triode tube, such as the well known UV 201A type of tube.

In Figure 2, I have shown a circuit embodying the ordinary three element type of tube which operates in a satisfactory fashion to produce the results described and shown in Figure 1. In Figure 2, a frequency changer 3, of the well known three element type has its input circuit tuned by a variable capacity $C_1$, the input circuit being coupled, as at M, to a grounded antenna circuit A, G. The filament of the tube is shown heated by a source A, the filament output of the circuit being controlled by a variable rheostat $R_1$ inserted in the negative leg of the filament. The output circuit of the tube is coupled, as at $M_1$, to an intermediate frequency amplifier, detector, and utilization means.

The local oscillator, in the circuit shown in Figure 2, embodies an electron discharge tube 4 having its grid connected to the plate circuit of tube 3 by a capacity K, the grid being connected to the positive leg of the filament by resistance R, there being a variable resistance $R_2$ inserted in the positive leg of the filament. A source of current "B" energizes the plate of the tube 4, the plate circuit of the tube being coupled as at $M_2$ to a circuit inserted in the plate circuit of tube 3.

A by-pass condenser $C_2$ is shunted across the primary of the coupling $M_1$ to by-pass radio frequency currents of the incoming signal. It will be obvious that by adjusting the variable capacity $C_3$ any desired heterodyning oscillations will be produced. In this case, the capacity equivalent to the capacity C in Figure 1, is the fixed capacity $C_f$, which is in this case the internal grid-plate capacity of the tube 3, shown in dotted lines in Figure 2.

I have found that when the capacity K is made equal to .001 mfd., the resistance R is made equal to 100,000 ohms, and the source "B" has a potential of 90 volts, that satisfactory results are secured. The operation of the circuit, as in the case of the circuit in Figure 1, involves balancing the effects of the lower heterodyne oscillation voltages on the grid and plate of the tube 3, while they are not in balance for the higher heterodyne oscillations.

While I have indicated and described only two systems for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:

1. A heterodyne receiver comprising signal energy collecting means, local oscillation means, a frequency changing tube having its grid circuit coupled to the collecting means and its plate circuit coupled to said local means, a reactance connected between the grid and plate of said tube, said reactance being adjusted to such a value that the grid potential due to local oscillations of a predetermined frequency is opposite in phase to the plate potential due to the same oscillations.

2. A heterodyne receiver comprising signal energy collecting means, local oscillation means, a frequency changing tube having its grid circuit tuned to signal frequency and its plate circuit coupled to said local means, a capacitive reactance connected between the grid and plate of the tube, said local oscillation means being adjusted to oscillate at the higher of the two possible frequencies adapted to produce difference frequency beats with the signal frequency, said reactance being of such a value that the effects of the voltages of the local oscillations of the lower frequency on the frequency changer grid and plate are balanced.

3. A heterodyne receiver comprising signal energy collecting means, local oscillation means, a frequency changing tube having its grid circuit tuned to the signal frequency and its plate circuit coupled to said local means, and a variable reactance connected between the grid and plate of said tube.

4. A receiving circuit comprising signal energy collecting means, local oscillation means, an electronic discharge means having its grid circuit connected to said collecting means and its plate circuit coupled to said local means, said grid circuit being tuned to the signal frequency, and a variable capacity connected between the plate and grid of said discharge means.

5. A heterodyne receiving circuit comprising signal energy collecting means, a source of local oscillations, a frequency changing tube having its grid circuit tuned to the signal frequency and connected to the collecting means and its plate circuit coupled to the local source, the capacity between the grid and plate of said tube being employed to balance the effects of heterodyne voltages on the grid and plate of said tube for the lower one of any possible pair of heterodyne frequencies produced by said local source.

6. A method of operating a heterodyne receiving circuit so that only one of the two possible heterodyne frequencies that might yield a desired difference frequency is permitted to produce an effect in the circuit, which consists in collecting signal energy, producing local oscillations, supplying said local oscillations and signal energy to a frequency changer, resonating the input circuit of said changer to signal frequency, and, finally, coupling the input and output circuits of said changer in such a manner that the effectiveness of one of said heterodyning frequencies in the production of said difference frequency is substantially eliminated.

7. A method of operating a heterodyne receiving circuit so that only the higher of the two possible heterodyne frequencies that might yield a desired difference frequency is permitted to produce an effect in the circuit, which consists in collecting signal energy, producing local oscillations, supplying said local oscillations and signal energy to a frequency changer, resonating the input circuit of said changer to signal frequency, and, finally, capacitively coupling the input and output circuits of said changer in such a manner that the effectiveness of the lower of said heterodyning frequencies in the production of said difference frequency is substantially eliminated.

8. A method of operating a heterodyne receiving circuit so that only one of the two possible heterodyne frequencies that might yield a desired difference frequency is permitted to produce an effect in the circuit, which consists in collecting signal energy, producing local oscillations, supplying said local oscillations and signal energy to a frequency changer, resonating the input circuit of said changer to signal frequency, and, finally, impressing voltages on the input and output circuits of said changer in such a manner that the effectiveness of one of said heterodyning frequencies in the production of said difference frequency is substantially eliminated.

9. A heterodyne receiver comprising signal energy collecting means, local oscillation means adapted to produce two possible heterodyne frequencies that might yield a desired difference frequency, an electron discharge tube having its input circuit tuned to the signal frequency and its ouput circuit coupled to said local means, and an impedance path between the input and output circuits of said tube for balancing out the effect of one of the heterodyne frequencies in the production of said difference frequency.

WALTER VAN B. ROBERTS.